United States Patent

Mizuma

[11] 4,298,226
[45] Nov. 3, 1981

[54] SUN-ROOF STRUCTURE FOR AUTOMOBILE BODIES

[75] Inventor: Takashi Mizuma, Hiroshima, Japan

[73] Assignee: Toyo Kogyo Co., Ltd., Hiroshima, Japan

[21] Appl. No.: 113,523

[22] Filed: Jan. 21, 1980

[30] Foreign Application Priority Data

Jan. 22, 1979 [JP] Japan .................................. 54-6333

[51] Int. Cl.³ ............................................... B60J 7/04
[52] U.S. Cl. .................................... 296/216; 296/220
[58] Field of Search ................ 296/216, 220, 221, 222

[56] References Cited

U.S. PATENT DOCUMENTS

| | | | |
|---|---|---|---|
| 1,919,387 | 7/1933 | Stringer | 296/216 |
| 3,298,731 | 1/1967 | Sangimino | 296/216 |
| 4,159,144 | 6/1979 | Ehlen | 296/222 |

Primary Examiner—Joseph F. Peters, Jr.
Assistant Examiner—John A. Carroll
Attorney, Agent, or Firm—Fleit & Jacobson

[57] ABSTRACT

Sliding-roof type sun-roof structure for automobile bodies comprising an opening formed in the roof panel and a sliding roof adapted for closing the opening. guide rail assembly is provided for guiding the sliding roof from the closing position to a retracted position wherein it is retracted under the roof panel. The guide rail assembly includes a front and rear sections which are connected in an articulated manner. The guide rail assembly is interconnected with the movement of the sliding roof so that it is downwardly bent at the articular connection when the sliding roof is being moved but maintained in a raised position when the sliding roof is in the closing and retracted positions so as to provide an increased overhead space.

5 Claims, 16 Drawing Figures

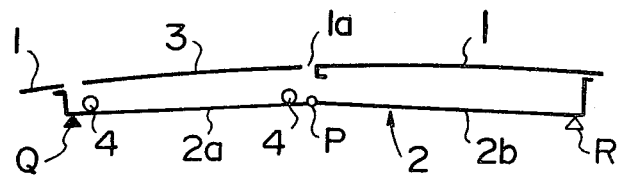
FIG. 1A
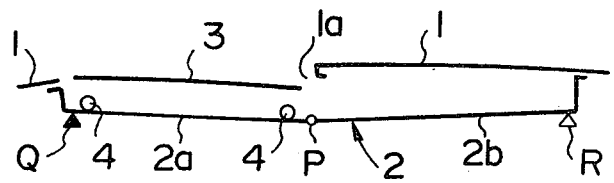
FIG. 1B
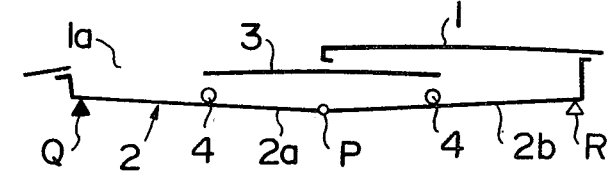
FIG. 1C
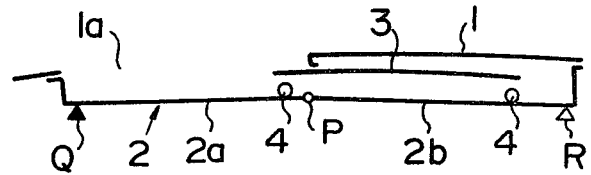
FIG. 1D
FIG. 2
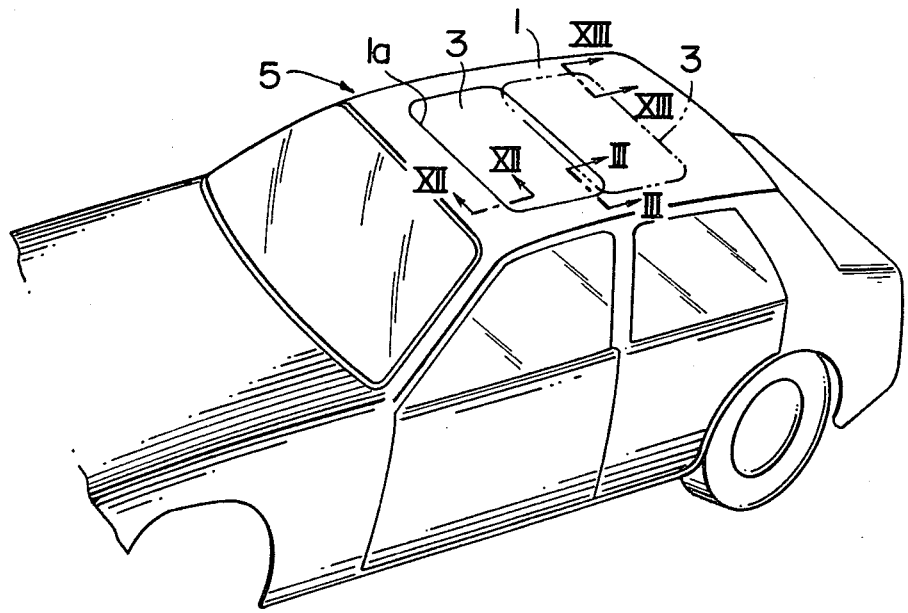

SUN-ROOF STRUCTURE FOR AUTOMOBILE BODIES

The present invention relates to sun-roof structures for automobile and more particularly to sliding roof structures therefor.

In automobile bodies, sun-roof structures are known as having roof panels formed with openings which are closed by closures or movable panels. Such sunroof structures include sliding roof type in which the movable panel for closing the opening in the roof panel is in the form of a sliding roof which is adapted to be slidably moved from the close position into an open or retracted position wherein it is retracted into a space beneath the roof panel. The roof panel is provided with guide rails which are adapted for guiding the sliding roof into and out of the close position. In this type of structures, it is necessary to move the sliding roof at first downwardly from the closed position and then into the retracted position so that the sliding roof is passed under a peripheral edge of the opening in the roof panel. For the purpose, it is therefore necessary to have the guide rails curved downwardly at their intermediate portions. In actual practice, it usually becomes necessary to locate the intermediate portions of the guide rails 50 to 60 mm below the roof panel. Although the sliding-roof type sun-roof structures are considered as being advantageous over other types in respects of convenience in operation and good appearances both in the close and retracted positions, they are disadvantageous in that the overhead space is limited due to the existence of the guide rails or the height of the body must be increased for providing an adequate overhead space.

It is therefore an object of the present invention to provide sliding roof structures having sliding roof guide rail arrangements which do not cause any significant restriction of overhead spaces.

Another object of the present invention is to provide sliding roof structures having guide rails which are downwardly bent only when the sliding roofs are being moved but the downward saliencies of the guide rails can be decreased both in the closing and retracted positions of the sliding roof.

According to the present invention, in order to accomplish the above and other objects, there is provided a sun-roof structure of a sliding-roof type for automobile bodies, said structure comprising roof panel means formed with opening means having peripheral edge, sliding roof means adapted for closing said opening means in closing position and movable to a retracted position wherein the sliding roof means is retracted under the roof panel means, guide rail means provided on the roof panel means for guiding the sliding roof means between the closing and retracted positions, said guide rail means including a first and second sections which are downwardly bendably connected with each other, means for maintaining the guide rail means in raised position against downward movement when the sliding roof means in the closing and retracted positions.

According to a preferable mode of the present invention, the first and second sections are connected together through articular connecting means. When the sliding roof means is being moved, the sliding roof means is released of the constraint of the maintaining means so that the guide rail means is downwardly bent or slackened to allow the sliding roof means to pass under the peripheral edge of the opening means.

In a specific structure, the guide rail means includes upper and lower guide surfaces and the sliding roof means is provided with roller means disposed between the upper and lower guide surfaces. Along the guide rail means, the roof panel means is provided with cam means and the sliding roof means with cam follower means so that the sliding roof means is lifted to thereby lift the guide rail means through engagement between the cam follower means on the sliding roof means and the upper surface of the guide rail means when the sliding roof means is in the close and retracted positions.

The above and other objects and features of the present invention will become apparent from the following descriptions of a preferred embodiment taking reference to the accompanying drawings, in which;

FIG. 1 is a schematic illustration showing the principle of operation of the sliding roof structure in accordance with the present invention;

FIG. 2 is a perspective view of an automobile body having a sliding roof structure;

Figure 3:
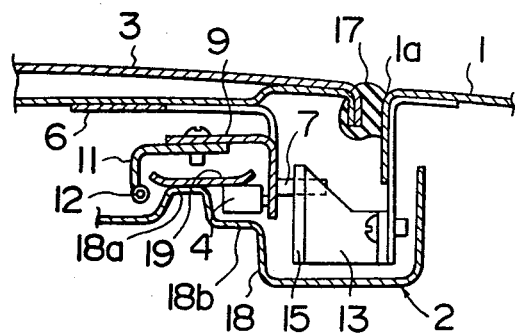
FIG. 3 is a sectional view taken substantially along the line III—III in FIG. 2.

Referring now to the drawings, particularly to FIG. 2, the automobile shown therein includes a body 5 which has a roof panel 1 formed with a substantially rectangular opening 1a. A closure or sliding roof 3 is provided for closing the opening 1a. The sliding roof 3 is mounted for slidable movement between the closing position and the retracted position shown by dotted lines in FIG. 2.

Referring now to FIG. 1, it will be noted that a guide rail assembly 2 is provided for guiding the sliding roof 3. The sliding roof 3 is provided with rollers 4 which are adapted for rolling engagement with the guide rail assembly 2. The guide rail assembly 2 comprises a front section 2a and a rear section 2b which are connected together by an articulate connection P. Further, the guide rail assembly 2 is supported at front and rear end portions pivotably about fulcrums Q and R. Thus, the guide rail assembly 2 can be bent downwardly as shown in FIGS. 1(B) and (C).

In FIG. 1(A) which shows the sliding roof structure in the closing position, the guide rail assembly 2 is lifted against downward bending by a suitable mechanism which will be described later. Therefore, the amount of downward saliency of the guide rail means is decreased and an adequate overhead space can be secured. When the sliding roof 3 is to be moved to the retracted position, it is at first moved downwardly as shown in FIG.

1(B), the guide rail assembly 2 being simultaneously allowed to be bent downwardly. Then, the sliding roof 3 is moved rearwardly as shown in FIG. 1(C) and, as soon as the sliding roof 3 reaches the retracted position, the front edge of the roof 3 is lifted to thereby lift the connection P of the guide rail assembly 2 as shown in FIG. 1(D).

Figure 4:
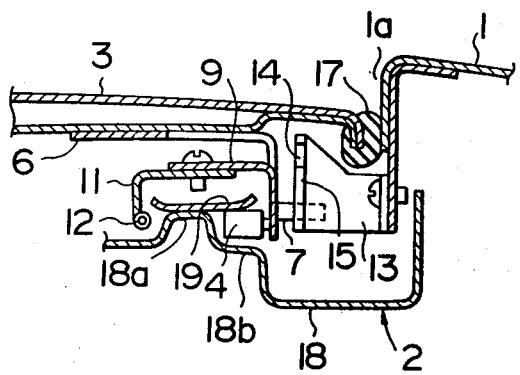
FIG. 4 is a sectional view similar to FIG. 3 but showing the sliding roof under movement.
Figure 5:
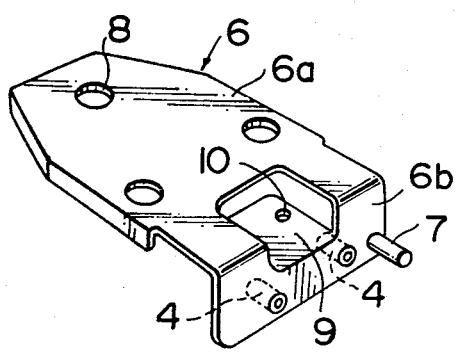
FIG. 5 is a perspective view showing the roller bracket adapted to be mounted on the sliding roof.
Figure 6:
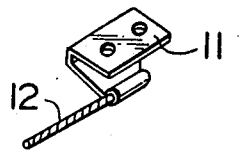
FIG. 6 is a perspective view of the cable bracket.
Figure 9:
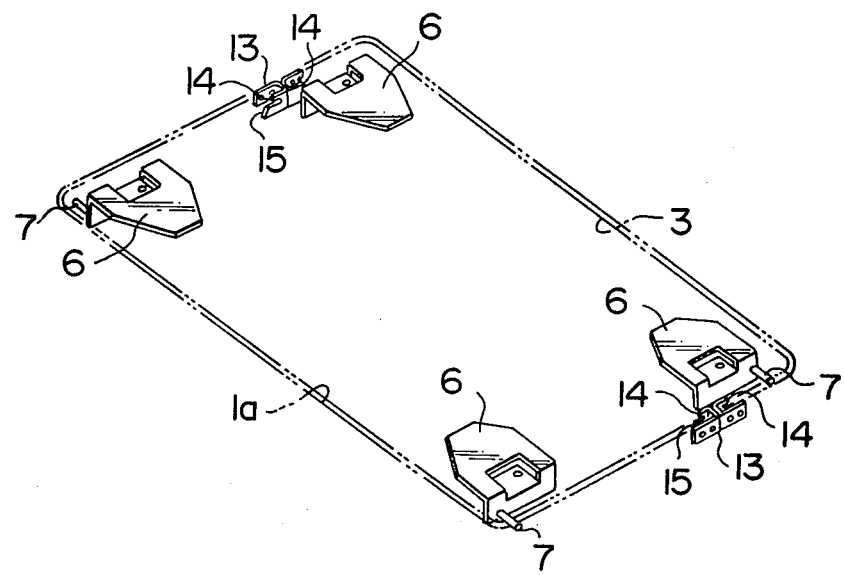
FIG. 9 is a perspective view showing the arrangements of the roller brackets and the lift cam brackets.

Referring now to FIGS. 3, 4 and 9, it will be noted that the sliding roof 3 has four roller brackets 6 secured to the lower surface thereof at portions adjacent to its respective corners. As shown in FIG. 5, each roller bracket 6 includes a base 6a having rivet holes 8 for attachment to the inner surface of the sliding roof 3 and a downwardly extending lug 6b for carrying a pair of rollers 4 on the inboard surface thereof. On the outboard surface of the lug 6b, there is a laterally extending cam follower pin 7. The roller bracket 6 is further formed with a laterally inwardly extending flange 9 which has rivet holes 10 for attachment with a cable bracket 11. As shown in FIG. 6, the cable bracket 11 is connected with an actuating cable 12 for effecting movements of the sliding roof 3.

Figure 10:
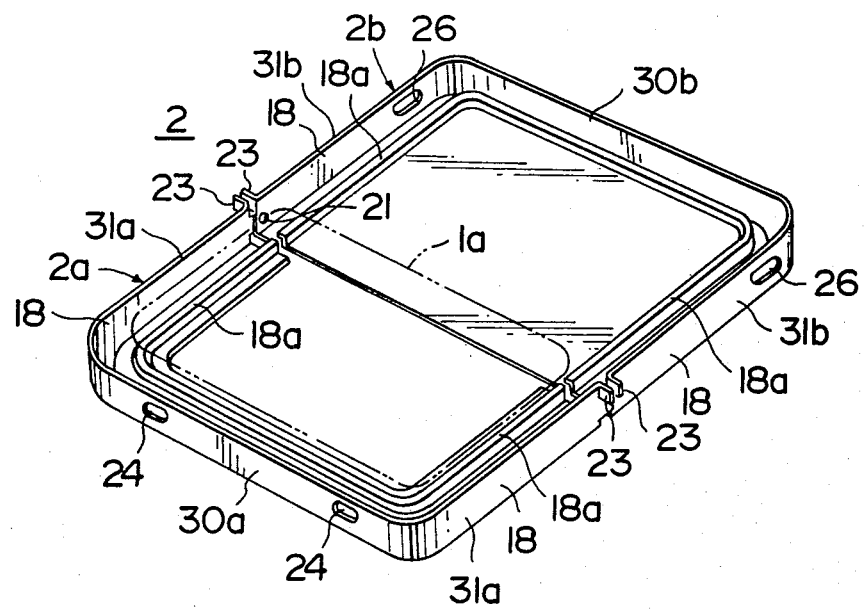
FIG. 10 is a perspective view of the guide rail assembly.
Figure 11:
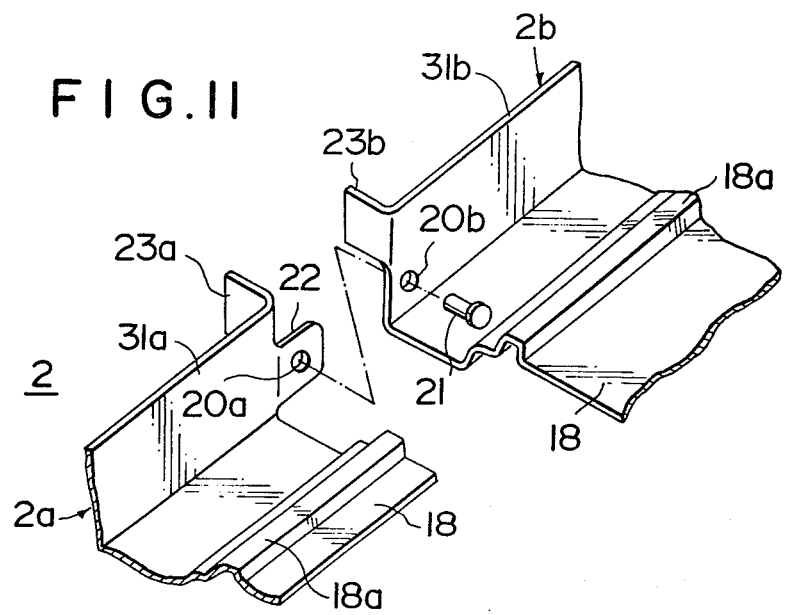
FIG. 11 is a fragmentary perspective view showing the connection between the front and rear sections of the guide rail assembly.

The guide rail assembly 2 is comprised of a front guide rail section 2a and a rear guide rail section 2b. As shown in FIG. 10, the front guide rail section 2a includes a laterally extending center portion 30a and a pair of side portions 31a extending rearwardly from the opposite ends of the center portion 30a. Similarly, the rear guide rail section 2b includes a laterally extending center portion 30b and a pair of side portions 31b extending forwardly from the opposite ends of the central portion 30b. As shown in FIG. 11, the side portion 31a of the front guide rail section 2a is formed at the rear end thereof with a rearwardly extending lug 22 which has a pin hole 20a formed therein. The side portion 31b of the rear guide rail section 2b is formed at the front end portion with a pin hole 20b which is adapted to be aligned with the pin hole 20a in the lug 22 and receive a pivot pin 21. In this manner, the front and rear guide rail sections 2a and 2b are connected at the ends of the side portions 31a and 31b in an articulated manner. The side portions 31a and 31b are also formed at their ends with outwardly bent lugs 23a and 23b respectively which are adapted for abutting engagement to limit the downward articulated movement of the guide rail assembly 2.

Figure 12:
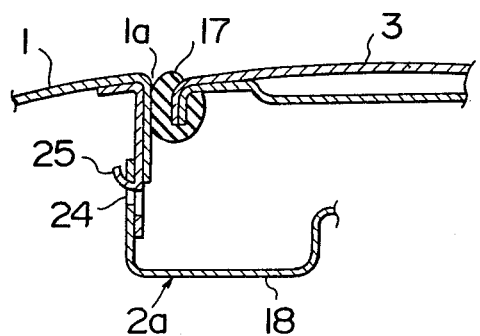
FIG. 12 is a fragmentary sectional view taken substantially along the line XII—XII in FIG. 2; and, FIG. 13 is a fragmentary sectional view taken substantially along the line XIII—XIII in FIG. 2.
Figure 13:
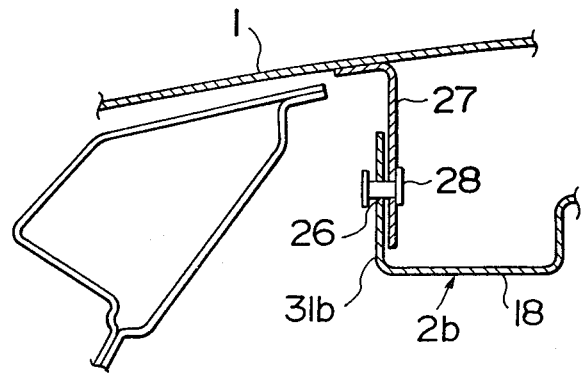

As shown in FIGS. 10 and 12, the center portion 30a of the front guide rail section 2a are formed with a pair of slots 24 which is engaged with hook portions 25 provided on the roof panel 1. The side portions 31b of the rear guide rail section 2b are formed at their rear end portions with pin holes 26 and the roof panel 1 has brackets 27 carrying pivot pins 28 which engage the pin holes 26 as shown in FIG. 13. Thus, the guide rail assembly 2 is formed and mounted in such a manner that it can be bent downwardly by its own weight to a limited extent.

Referring back to FIGS. 3 and 4, each side portion of the guide rail sections includes a lower member 18 having a longitudinally extending land portion 18a and an upper member 19 attached to the land portion 18a. The upper member 19 extends laterally outwardly from the land portion 18a so as to provide an upper guide surface. The lower member 18 is formed with a shelf portion 18b which provides a lower guide surface located directly beneath the upper guide surface. The rollers 4 on each of the roller brackets 6 are located in the space between the upper and lower guide surfaces and engage either of the guide surfaces.

Figure 7:
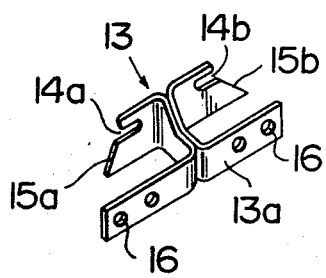
FIG. 7 is a perspective view of the lift cam bracket.
Figure 8:
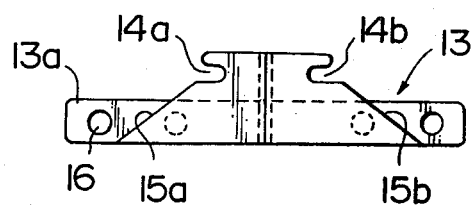
FIG. 8 is a side view of the lift cam bracket shown in FIG. 7.

In each side of the opening 1a, the roof panel 1 is provided with a lift cam bracket 13 which is located adjacent to the rear edge of the opening 1a as shown in FIG. 9. As shown in FIGS. 7 and 8, the lift cam bracket 13 includes a base 13a having rivet holes 16 for attachement to a suitable bracket on the roof panel 1. Further, the lift cam bracket 13 has a forwardly opened slit 14a and a rearwardly opened slit 14b and front and rear lift cam surfaces 15a and 15b which are contiguous with the slits 14a and 14b, respectively. The slits and the cam surfaces are adapted for engagement with cam follower pins 7 on the roller brackets 6.

As shown in FIG. 9, the roller brackets 6 on the front end portion of the sliding roof 3 carry the cam follower pins 7 at the front end portions thereof while the roller brackets 6 on the rear end portion of the sliding roof 3 carry the cam follower pins 7 at the rear end portions thereof. Thus, the cam follower pins 7 on the front side roller brackets 6 are designated with a suffix a and the cam follower pins 7 on the near side brackets 6 with a suffix b. When the sliding roof 3 is in the closing position, the rear cam follower pins 7b on the rear side roller brackets 6 ride on the cam surfaces 15b and engage with the rearwardly opened slits 14b so that the sliding roof 3 is maintained at the lifted position as shown in FIG. 3. In this position, the rollers 4 on the brackets 6 are also lifted and engaged with the upper guide surfaces of the upper members 19 to thereby lift the end portions of the side portions 31a and 31b to the position as shown in FIG. 1(A). In order to provide weather-tight seal between the roof panel 1 and the sliding roof 3, the sliding roof 3 has seal members 17 along its periphery.

When the sliding roof 3 is moved rearwardly, the rear cam follower pins 7b are disengaged from the slits 14b so that the sliding roof 3 is lowered as shown in FIG. 4. The guide rail assembly 2 is then correspondingly bent downwardly at the articulated connections between the side portions 31a and 31b of the guide rail sections 2a and 2b. As the pins 7b are disengaged from the cam surfaces 15b, the roller brackets 6 are lowered until the rollers 4 engage with the lower guide surfaces on the lower members 18. At this moment, the guide rail assembly 2 is bent to the extreme downward position as shown in FIG. 1(B). Thus, the sliding roof 3 can be passed under the rear edge of the opening 1a as shown in FIG. 1(C). In the retracted position of the sliding roof 3, the front cam follower pins 7a on the front side roller brackets 6 ride on the cam surfaces 15a and engage with the forwardly opened slits 14a. Thus, the roller brackets 6 and the front end of the sliding roof 3 are lifted. At the same time, the rollers 4 on the front side brackets 6 engage with the upper guide surfaces on the upper members 19 to thereby lift the guide rail assemblies 2 at the articulated connections between the side portions 31a and 31b of the guide rail sections 2a and 2b as shown in FIG. 1(D). It should be understood that similar operations are repeated when the sliding roof 3 is moved from the retracted position to the closing position.

The invention has thus been shown and described with reference to a specific embodiment, however, it should be noted that the invention is in no way limited to the details of the illustrated structures but changes and modifications may be made without departing from the scope of the appended claims.

I claim:

1. Sun-roof structure of a sliding-roof type for automobile bodies, said structure comprising roof panel means formed with opening means having peripheral edge, sliding roof means adapted for closing said opening means in a closing position and movable to a retracted position wherein the sliding roof means is retracted under the roof panel means, guide rail means provided on the roof panel means for guiding the sliding roof means between the closing and retracted positions, said guide rail means including front and rear sections which are downwardly bendably connected with each other, said front section having a front end portion pivotably mounted on the roof panel means, said rear section having a rear end portion pivotably mounted on the roof panel means, cam means provided on the roof panel means along the guide rail means and cam follower means provided on the sliding roof means for engagement in said closing and retracted positions of the sliding roof means with the cam means so that the sliding roof means is lifted when the cam follower means is engaged with the cam means, and means for interconnecting the sliding roof means with the guide rail means so that the guide rail means is lifted when the sliding roof means is lifted.

2. Sun-roof structure in accordance with claim 1 in which said interconnecting means comprises upper guide surface means in the guide rail means and roller means provided on the sliding roof means and located under the upper guide surface means of the guide rail means.

3. Sun-roof structure in accordance with claim 1 in which said cam means on the roof panel means is located adjacent to an intermediate portion of the guide rail means, said cam follower means being located on the sliding roof means adjacent to fore and aft end portions thereof.

4. Sun-roof structure in accordance with claim 1 in which said front section of the guide rail means comprises an elongated transversely extending center portion having opposite ends and a pair of front side portions extending rearwardly from the ends of the center portion, said rear section of the guide means comprises an elongated transversely extending center portion having opposite ends and a pair of rear side portions extending forwardly from the ends of the center portion, said front and rear side portions having free ends which are connected together in articulated manners.

5. Sun-roof structure in accordance with claim 4 in which said front and rear sections are pivotably mounted on the roof panel means at portions apart from the free ends of the front and rear side portions.

* * * * *